United States Patent [19]

Robin et al.

[11] Patent Number: 5,782,034
[45] Date of Patent: Jul. 21, 1998

[54] RODENT TRAP

[75] Inventors: Roger L. Robin; John A. Hanawalt; Jeffrey M. Watts, all of Hanover, Me.

[73] Assignee: The Maine Mouse-ah, Inc., Hanover, Me.

[21] Appl. No.: 711,166

[22] Filed: Sep. 9, 1996

[51] Int. Cl.$^6$ .................................................. A01M 23/10
[52] U.S. Cl. .......................................... 43/71; 43/64
[58] Field of Search ............................ 43/71, 64, 65, 43/68, 69, 70

[56] References Cited

U.S. PATENT DOCUMENTS

| | | | |
|---|---|---|---|
| 710,020 | 9/1902 | Short | 43/71 |
| 1,050,220 | 1/1913 | Link | 43/71 |
| 1,630,123 | 5/1927 | Kesel et al. | 43/71 |
| 1,802,253 | 4/1931 | Hein et al. | 43/70 |
| 2,619,765 | 12/1952 | Sees | 43/64 |
| 3,528,191 | 9/1970 | Hand | 43/64 |
| 4,845,887 | 7/1989 | Snyder | 43/71 |
| 5,517,784 | 5/1996 | Sedore | 43/64 |
| 5,528,852 | 6/1996 | Sarff | 43/71 |

FOREIGN PATENT DOCUMENTS 52879  12/1911  Austria ........................... 43/71

*Primary Examiner*—Michael J. Carone
*Assistant Examiner*—Theresa M. Wesson
*Attorney, Agent, or Firm*—Chris A. Caseiro; Thomas L. Bohan

[57] ABSTRACT

A pest-trapping device that enables quick and easy containment of one or more rodents such as mice or rats. The device includes a container that may be easily manufactured in a unitary piece. A dowel is fixed between opposing walls of the container. A rodent access ramp spans a distance from the surrounding floor to the dowel. An entry hole is located adjacent to the ramp connection to the dowel to provide a rodent path into the container. A baited spinner is rotationally placed on the dowel so that a rodent travelling up the ramp, through the entry hole, and along the dowel will climb atop the baited spinner and lose its balance. The rodent will then be trapped in a well portion of the container. The well may be empty or may contain a quantity of fluid sufficient to drown the rodents. The spinner is preferably formed in the shape of an hourglass.

20 Claims, 2 Drawing Sheets

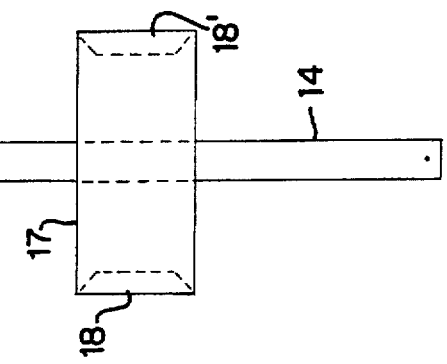
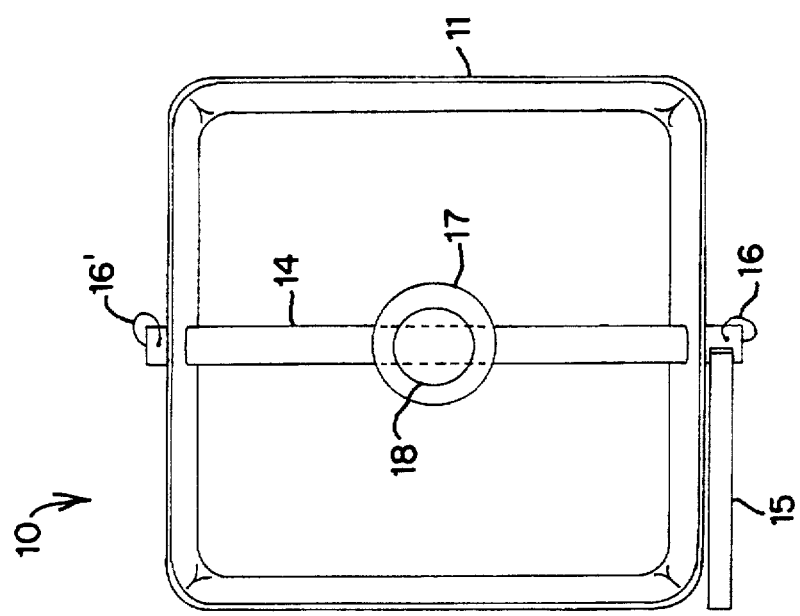
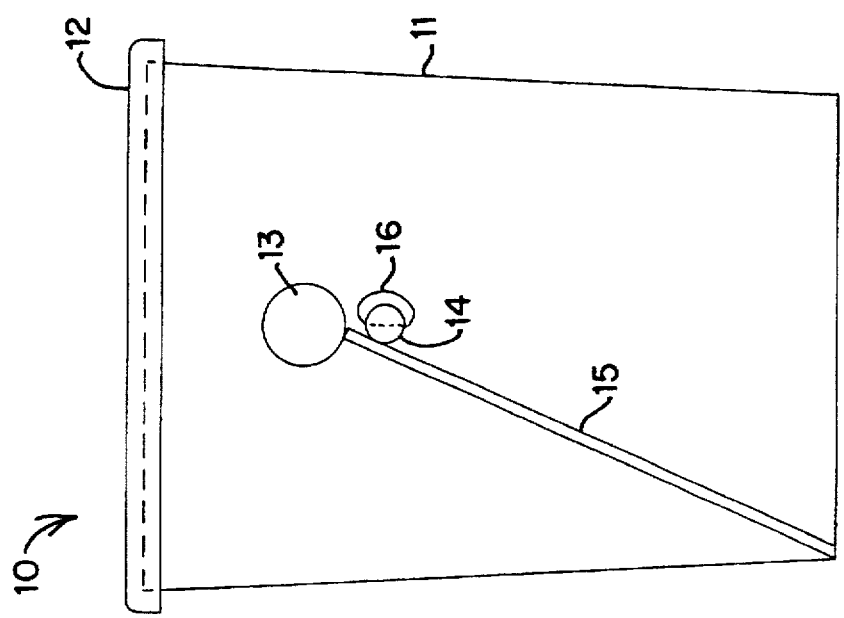

RODENT TRAP

BACKGROUND OF THE INVENTION

1. Field of Invention

The present invention relates to the field of pest control. More particularly, the present invention relates to a device for providing an efficient means of trapping rodents. More particular yet, the present invention involves a container for trapping a multiplicity of mice or rats, where the container includes easily assembled components designed to coerce the mouse or rat into the container and retain it therein.

2. Description of Prior Art

Pest control—especially mouse and rat control—is a well-known concern to property owners. Rodent infestation is a serious problem both in rural environs—where the onset of winter causes rodent migration from their outdoor habitat to indoor locations—and in crowded urban areas. The problem is acute in urban trash alleys, along fishing wharves, and especially situations where a property owner is not always present—e.g., a summer vacation home, a seasonal business property, a farm outbuilding, or a remote worksite shed. Rodent infestation over a period of time results in significant property damage necessitating costly repairs and replacement. It also is a pressing health problem. Accordingly, much effort has been made to eradicate rodents from indoor and outdoor locations and a great many methods and means have existed to assist this task.

One approach property owners have used in dealing with rodent infestation has been to turn for help to pest extermination companies. Unfortunately, these extermination companies are usually costly and tend to utilize dangerous chemicals and poisons to kill rodents where the rodents live and breed. In addition to the resultant malodorous and bio-hazardous effects arising from dead rodents decomposing within walls, rafters, floors, and various other hidden locations, the extermination materials themselves pose a safety hazard to property owners and their domestic pets. Residual chemicals and left-over poisons typically exist long after the rodent infestation is abated. In most cases, commercial pest extermination has proven to be too costly, both in terms of money and in terms of health effects, to be a practical option.

Thus, there have long been attempts to facilitate do-it-yourself trapping of mice and rats. In general, the complexity of such efforts has undercut whatever advantages they might otherwise offer. Indeed, the time and effort involved in using complex and inefficient rodent traps is self-defeating. The well-known standard mouse-trap includes a strong spring, a wire clamp, and a bait-trigger all mounted on a small rectangular piece of wood. The wire clamp is manually set against the force of the spring and the bait-trigger precariously prevents the wire clamp from snapping shut. Such a design is found in a variety of sizes with smaller ones used for mice and larger ones used for rats. A piece of food is placed on the bait-trigger so that when a rodent or other animal disturbs the food, the wire clamp snaps shut. Ideally this snaps down on the mouse's neck and break it; however, it is also possible for the mouse to trip the mouse-trap without being caught or, worse, to be caught without being killed. In addition to the untidy gore such a trap may create, this design must be manually set, and must be re-baited and re-set often; it creates a mechanical hazard for curious pets and children. Other prior-art pest traps have their own disadvantages.

One prior-art pest trap is that of Snyder (U.S. Pat. No. 4,845,887) Snyder provides a device having a containment cavity that is mounted in a floor. Small rodents are enticed through orifices located in the sides of the device at floor level. The orifices are attached to tubes that end within the containment cavity just above a rotationally mounted cylindrical wheel. The source of the mouse's enticement is bait located in the wheel. The mouse moves onto the wheel, causing it to rotate. This apparently causes the mouse to drop from the wheel and fall through a false bottom and drown in a liquid contained in the bottom of the device. This complex arrangement is difficult to empty when disposal of trapped rodents becomes necessary. More importantly, this design is limited to placement within a hole in a floor, something that is not always possible and desirable.

Other such self-contained pest traps exist that are deficient for reasons similar to those noted for the Snyder device. A general defect of prior-art pest traps are that they do not account for the keen sense of balance that rodents possess. Devices typical of the wheel-driven trap like that of Snyder are found in Hand (U.S. Pat. No. 3,528,191), Sees (U.S. Pat. No. 2,619,765), Friesenhahn (U.S. Pat. No. 1,574,806), and Short (U.S. Pat. No. 710,020). The primary trapping component throughout these devices is a baited wheel that, ideally, rotates when a rodent is on it. However, just as a lumberjack will steady himself upon a log floating in water, a rodent is commonly agile enough to traverse such baited wheel and exit the trap after not having accessed the food. Also, throughout the prior-art the orientation of the wheel itself does not ensure rotation. Arranged for rotation about its longitudinal axis, the cylindrical wheel of the prior-art typically has a small radius and commensurately high degree of stability even with a rodent atop the wheel. i.e., the prior-art of this type fails to provide a wheel having a radius sufficiently large to provide an adequately high degree of instability when a rodent is atop the wheel.

Another such prior-art pest trap that includes a rotating bait is a device of Johnson (U.S. Pat. No. 452,575). This is a simple device that includes a plank having a rotatable baited cross at one end. The end opposite the baited end rests on a floor while the baited end rests on the edge of a bucket half-filled with water. The baited cross is suspended over the water so that the rodent is enticed up the plank towards the baited cross. Ideally, the rodent loses its balance when reaching for the bait attached at the tips of the cross. Unfortunately, the Johnson device, as can be seen clearly by his drawings, is designed such that a rodent may firmly stand on the fixed plank and reach the baited cross without losing its balance. As well, even a rodent unfortunate enough to slip into the water may grasp the cross, pull itself from the water, and exit the bucket via the plank. Accordingly, the device of Johnson fails to provide adequate assurance of rodent capture.

There also exists a type of prior-art pest trap that is similar to the rotating wheel design, but instead involves a series of rotating platforms. Representative examples of such a design are shown in Robbins (U.S. Pat. No. 2,110,678), Poe (U.S. Pat. No. 1,653,411), and Reppe (U.S. Pat. No. 1,355,264). These prior-art pest traps all include a container and a trap door atop the container. Ideally, a rodent is attracted to some bait and enticed to traverse the trap door. Triggers and counterbalancing are used to activate the trap door and drop the rodent into the container. The complexity of these designs, with numerous moving parts, decreases their reliability. Further, a rodent traversing the trap door near the axis of rotation will not likely activate it. Therefore, rotating trap-door designs shown by the prior-art pest traps fail to provide an efficient means of rodent containment.

Accordingly, the prior art fails to provide any pest-trapping device that ensures a rodent's loss of balance and resultant containment. Therefore, what is needed is a rodent trap that provides quick and easy setup and baiting. What is also needed is such a trap that ensures containment of a plurality of rodents without creating an eyesore or a bio-hazard. Further, what is needed is such a rodent trap that enables capture of a multitude of rodents on a single baiting and setting without requiring constant supervision.

SUMMARY OF THE INVENTION

It is an object of the present invention to provide a rodent trap that eliminates the opportunity for a rodent to elude capture and containment. Another object of the present invention is to provide a rodent trap having a simple design of but few parts so that the device is easily and quickly and baited. Yet another object of the present invention is to provide a rodent trap that is easily disguised so as to not create an eyesore. Still another object of the present invention is to provide a rodent trap that is substantially enclosed and isolates captured rodents so as to preclude the device being a bio-hazard. It is also an object of the present invention to provide such a rodent trap that may be used anywhere for extended periods of time so as to capture multitudes of rodents.

These and other such objects are achieved by a rodent trap according to the present invention that includes a hollow container with a lid. The container can be of any shape, though, for the sake of definiteness, it is depicted here as a rectangular trapezoid. Also, the container may or may not include a decorative exterior. The container has a small hole on one side near its top to facilitate rodent entry into the container. An exterior ramp leads from a substrate, such as flooring, to the entry hole. Inside the container and just below the entry hole is a relatively large beam that spans the center of the container's interior. The beam may be secured in place via holes in opposing sides of the container, or, alternatively, may be secured in mounting sockets on opposing inner-sides of the container. A rotatable spinner has a hole through its center and is balanced on the beam about its vertical axis. The spinner is the bait-containing device designed to spin easily on the beam. While the preferred, but not required, shape of the spinner is cylindrical, the instant invention differs greatly from the prior-art in that the spinner rotates about a centrally located width-wise axis perpendicular to its lengthwise axis and does not rotate around its lengthwise axis like a wheel.

Baiting of the rodent trap is accomplished by placement of peanut butter or some similar rodent-enticing food into the spinner—typically, though not limited to, bait-receiving cups that are provided at both ends of the spinner. When a rodent, such as a common mouse, smells the peanut butter, it is drawn to the rodent trap. The rodent then ascends the ramp, travels through the entry hole, traverses the dowel, and attempts to jump onto or climb atop the cylinder to access the bait. This causes the cylinder to rotate about the dowel, causing the rodent to lose its balance and drop into the container's well. Because of the cylinder's orientation upon the dowel, the baited cylinder then resets automatically in preparation for the next victim.

While the container's well may be empty, it is necessary that the container be made tall enough and sufficiently smooth to prohibit the rodent's escape when it is located in the container's well. Alternatively, the container may contain several inches of a substance that will effectively kill the rodents. Typically, the substance will be a fluid, such as water, of a sufficient quantity to drown the rodents. In locations where temperatures may fall below freezing, an environmentally safe anti-freeze may be used instead of water. It should be noted that a variety of substances may be used within the container including, but not limited to, non-odorous disinfectants, gels, or foams, all without straying from the intended scope of the invention.

The rodent trap of the present invention may be manufactured efficiently as a single-piece container with few separate parts. The materials used may be plastic or metal and may be press-stamped or molded; however, any suitable materials and methods of manufacture may be used, even commonly available three or five gallon plastic buckets. Besides the container proper, the container cover, ramp, dowel, cylinder, and cups included as part of the device may be formed of plastic, wood, metal, or any suitable material.

It is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

BRIEF DESCRIPTION OF THE DRAWINGS

FIG. 1 is a side view of a trapping device in accordance with the preferred embodiment of the present invention showing a cover and ramp to an access hole.

FIG. 2 is a top view of the trapping device as shown in FIG. 1 with the cover removed.

FIG. 3 is a detailed top view of a spinner portion of the trapping device as shown in FIG. 1.

DETAILED DESCRIPTION OF THE PREFERRED EMBODIMENT

Figure 4:
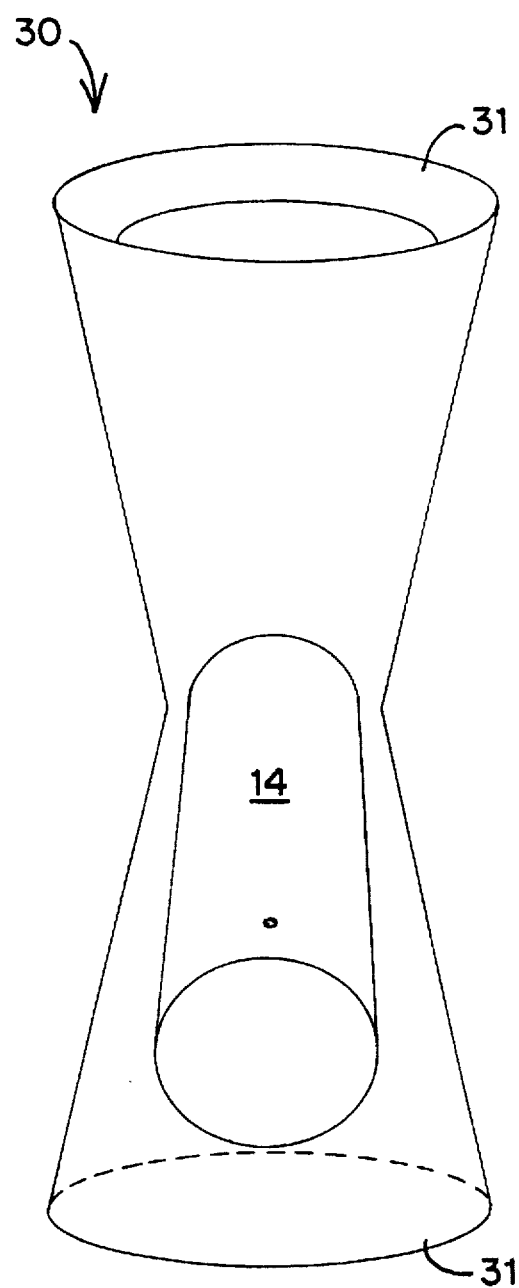
FIG. 4 is a side view of an alternative spinner design of the present invention.

In FIG. 1, a rodent trap 10 is shown according to the preferred embodiment of the present invention. The rodent trap 10 includes a container 11 that is shown in a substantially rectangular shape. This configuration permits easy placement of the container 11 into a corner of a room. Of course, the container 11 may be of most any geometric configuration. A cover 12 is placed over the top of the container 11. The cover 12 is removable so as to provide access into container 11. Shown on the side of the container 11 is a ramp 15 and access hole 13. The ramp 15 provides a path for a pest—such as a mouse or rat—to gain entry into the rodent trap 10 through access hole 13. The ramp 15 rests at one end on the ground or floor beside the rodent trap 10 and at the other end on a beam, shown as a dowel 14, that protrudes through container 11. The ramp 15 and the dowel 14 are fixedly secured together by any suitable method; e.g., welding, gluing, bolting, screwing, or nailing. A pair of securing means, shown as plastic ties 16 and 16' (16' shown in FIG. 2), holds the dowel 14 axially in place.

FIG. 2 is a top view of the rodent trap 10 with the cover 12 removed. Both plastic ties 16 and 16' are shown holding ends of the dowel 14 in place in the upper sides of the container 11. A substrate or "spinner" of any suitable shape, shown as a cylinder 17, is centrally located on the dowel 14 within the container 11. The dowel 14 passes loosely through the cylinder 17 in an aperture that is perpendicular to the longitudinal axis of the cylinder 17. The cylinder 17 is preferably made of lightweight plastic so as to rotate easily through its longitudinal axis about the dowel 14. The ends of cylinder 17 includes cups 18 and 18' (18' shown in FIG. 3). Rodent-enticing food—such as peanut butter or cheese—is placed in both cups 18 and 18' in equal amounts so as to counterbalance the cylinder 17.

In operation, the cylinder 17 is rotatable so that a rodent loses its balance in attempting to reach the food and one of either cups 18 or 18' on the cylinder 17 containing the rodent-enticing food swings itself upright upon the rodent dropping off the cylinder 17. The rodent reaches the cylinder 17 by walking on the dowel 14. The configuration of the container 11 is such that the cylinder 17 will fail to rotate by catching on the sides of the container 11. The container 11 is sufficiently sized to contain a quantity of rodents. It is also designed so that the rodents cannot escape and so that their immediate removal is not required. For purposes of illustrative clarity, the container 11 is shown empty. However, it should be noted that various substances—e.g., water, disinfectant, antifreeze, gel, foam—may be utilized in the bottom of container 11 to asphyxiate, or otherwise accelerate the death of, the trapped rodent.

For clarity, the cylinder 17 mounted on the dowel 14 in FIG. 2 are shown in greater detail in FIG. 3. In FIG. 3, both cups 18, 18' are visible and shown by hidden lines in the ends of the cylinder 17. In normal use, the cylinder 17 will freely rotate about the dowel 14 without migrating along the dowel 14 towards either of its ends. It should be understood that any methods of maintaining the cylinder 17 centrally on the dowel 14—such as via common retaining clips—are intended to be within the scope of the present invention. Once the rodent trap 10 has been used and requires emptying and cleaning, the cover 12 is removed and the plastic ties 16, 16 are undone. The dowel 14, with or without the ramp 15 attached, is pulled out of its placement in the container 11 allowing cylinder 17 to separate therefrom. At this point, the container 11 may be easily emptied and cleaned. Also, the cups 18, 18', dowel 14, ramp 15, and cylinder 17 are now separated and easily cleaned as necessary. The cleaned parts may then be re-assembled for re-use.

An alternative spinner 30 of the present invention is shaped in an hourglass form with a center opening through which the dowel 14 passes. The spinner 30 operates in essentially the same manner that the cylinder 17. However, with this spinner 30, the cross section at the region where the dowel 14 is positioned is less than the cross section of bait-holding regions 31 such that the spinner 30 is more inclined than the cylinder 17 to tip when the rodent moves on to it. It is also more inclined to "right" itself in an upright, or vertical, position when the rodent falls into the container 11. As with the cups 18, 18', of the cylinder 17, bait-holding regions 31 are designed to retain bait to lure the rodent. In addition, with the noted hourglass design, less bait is required to initiate a tipping of the spinner 30. The spinner 30 may be fabricated of any material, preferably any type of viscoelastic material, such as an injection-moldable plastic, may be used.

It should be understood that the preferred embodiments mentioned here are merely illustrative of the present invention. Numerous variations in design and use of the present invention may be contemplated in view of the following claims without straying from the intended scope and field of the invention herein disclosed.

We claim:
1. A pest-containment device comprising:
   a) a container means for trapping a pest;
   b) a pest-access means for providing entry to said container means, said pest-access means having a transverse portion; and
   c) a substrate having one or more bait-retaining ends, said substrate having a central aperture therethrough and perpendicular to a longitudinal axis of said substrate;
   wherein said substrate is substantially centrally located within said container means and rotationally held on said transverse portion of said pest-access means so that said substrate is balanced to remain in a substantially upright vertical position while being rotatable about said transverse portion.

2. The pest-containment device as claimed in claim 1, said pest-access means comprising:
   a) an entry hole located on said container means; and
   b) a ramp coupled to a protruding section of said transverse portion, said ramp located adjacent said entry hole;
   wherein said transverse portion is located inside said container means and adjacent said entry hole to span across said container means.

3. The pest-containment device as claimed in claim 2 wherein said transverse portion is a wooden dowel having a first dowel-end and a second dowel-end.

4. The pest-containment device as claimed in claim 3 wherein said container means includes a first dowel-retaining-hole located just below said entry hole and a second dowel-retaining-hole located opposite said first dowel-retaining-hole,
   said first dowel-end is received within said first dowel-retaining-hole and maintained therein by a first retaining means, and
   said second dowel-end is received within said second dowel-retaining-hole and maintained therein by a second retaining means.

5. The pest-containment device as claimed in claim 4 wherein said ramp is fixed to said first dowel end.

6. The pest-containment device as claimed in claim 5 wherein said container means includes a removable lid.

7. The pest-containment device as claimed in claim 1 wherein said bottom of said container means contains a substance sufficient to kill a plurality of rodents.

8. The pest-containment device as claimed in claim 7 wherein said substance is water.

9. The pest-containment device as claimed in claim 7 wherein said substance is environmentally-safe antifreeze.

10. The pest-containment device as claimed in claim 1 wherein said substrate is an hourglass-shaped cylinder.

11. A containment device for use in trapping one or more rodents, said device comprising:
   a) a container means for trapping said one or more rodents, said container means having a removable lid, and four sides;
   b) an entry hole located within one of said four sides;
   c) a ramp located beside an exterior of said one of said four sides, said ramp leading from a bottom corner of said exterior to said entry hole;
   d) a transverse portion located inside said container means and just below said entry hole to span across said container means; and
   e) an hourglass-shaped cylinder having two bait-retaining ends, said cylinder having a central aperture therethrough and perpendicular to a longitudinal axis of said cylinder;
   wherein said cylinder is centrally located within said container means and rotationally held on said transverse portion so that said cylinder is balanced to remain in a substantially upright vertical position while being rotatable about said transverse portion.

12. The device as claimed in claim 11 wherein
said transverse portion includes a first end and a second end,
said container means includes a first retaining hole located just below said entry hole and a second retaining hole located directly opposite said first retaining hole,
said first end is received within said first retaining hole and maintained therein by a first retaining means, and
said second end is received within said second retaining hole and maintained therein by a second retaining means.

13. The device as claimed in claim 12 wherein said transverse portion is a wooden dowel, and said first retaining means and said second retaining means are plastic ties.

14. The device as claimed in claim 13 wherein said ramp is affixed to said first end of said transverse portion.

15. The device as claimed in claim 14 wherein said bottom of said container means is sufficiently deep enough to preclude escape by any rodent.

16. The device as claimed in claim 15 wherein said container means contains a substance sufficient to kill a plurality of rodents.

17. The device as claimed in claim 16 wherein said substance is water.

18. The device as claimed in claim 16 wherein said substance is environmentally-safe antifreeze.

19. A containment device for eradication of one or more rodents, said device comprising:

a) a container having a decorative exterior, a removable top, a first side, a second side, a front side, and an entry side;

b) an entry hole located within said entry side;

c) a dowel traversing an interior of said container from said front side to said entry side, said dowel located just below said entry hole and retained within holes in said front side and said entry side;

d) a ramp affixed to said dowel and located beside said decorative exterior on said entry side of said container; said ramp leading from a bottom corner of said entry side to said entry hole; and e) an hourglass-shaped cylinder having two bait-retaining ends and a central aperture therethrough, said aperture being oriented perpendicular to a longitudinal axis of said cylinder;

wherein said cylinder is centrally located within said container and rotationally held on said dowel so that said cylinder is balanced to remain in a substantially upright position along said longitudinal axis while being rotatable about said dowel.

20. The containment device as claimed in claim 19 wherein said container includes a substance sufficiently deep enough to kill a plurality of rodents, said substance being selected from a group consisting of water and environmentally-safe antifreeze.

* * * * *